(12) United States Patent
Taillefer et al.

(10) Patent No.: US 8,176,253 B2
(45) Date of Patent: May 8, 2012

(54) LEVERAGING TRANSACTIONAL MEMORY HARDWARE TO ACCELERATE VIRTUALIZATION AND EMULATION

(75) Inventors: Martin Taillefer, Redmond, WA (US); Darek Mihocka, Mercer Island, WA (US); Bruno Silva, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 11/823,236

(22) Filed: Jun. 27, 2007

(65) Prior Publication Data

US 2009/0006751 A1 Jan. 1, 2009

(51) Int. Cl.
G06F 12/00 (2006.01)
G06F 9/455 (2006.01)
G06F 9/44 (2006.01)

(52) U.S. Cl. ............ 711/121; 703/24; 711/E12.02; 711/E12.044; 717/169

(58) Field of Classification Search .......... None
See application file for complete search history.

(56) References Cited

U.S. PATENT DOCUMENTS

| | | | |
|---|---|---|---|
| 5,428,761 A | 6/1995 | Herlihy et al. | |
| 5,832,205 A | 11/1998 | Kelly et al. | |
| 5,940,838 A | 8/1999 | Schmuck et al. | |
| 6,775,727 B2 | 8/2004 | Moyer | |
| 6,880,045 B2 | 4/2005 | Pong et al. | |
| 6,938,130 B2 * | 8/2005 | Jacobson et al. | 711/144 |
| 6,983,357 B2 | 1/2006 | Poff et al. | |
| 7,058,932 B1 | 6/2006 | Jennings et al. | |
| 7,181,608 B2 | 2/2007 | Fallon et al. | |
| 7,617,421 B2 * | 11/2009 | Caprioli et al. | 714/49 |
| 7,617,438 B2 | 11/2009 | Brown et al. | |
| 7,620,731 B1 | 11/2009 | Dasan et al. | |
| 2003/0182462 A1 | 9/2003 | Moir et al. | |
| 2003/0236794 A1 | 12/2003 | Hostetter et al. | |
| 2004/0015642 A1 | 1/2004 | Moir | |
| 2004/0187123 A1 * | 9/2004 | Tremblay et al. | 718/100 |
| 2005/0076324 A1 | 4/2005 | Lowell et al. | |
| 2005/0086446 A1 | 4/2005 | McKenney et al. | |
| 2005/0210198 A1 | 9/2005 | Dimpsey et al. | |
| 2006/0085591 A1 | 4/2006 | Kumar et al. | |
| 2006/0161737 A1 | 7/2006 | Martin et al. | |
| 2006/0161740 A1 | 7/2006 | Kottapalli et al. | |
| 2007/0073528 A1 | 3/2007 | Watt et al. | |
| 2007/0192079 A1 | 8/2007 | Rompaey et al. | |

(Continued)

OTHER PUBLICATIONS

Saha, Bratin, et al. "Architectural Support for Software Transactional Memory." The 39th Annual IEEE/ACM International Symposium on Microarchitecture (MICRO'06). 12 pages, Dec. 2006.

(Continued)

*Primary Examiner* — Reginald Bragdon
*Assistant Examiner* — Aracelis Ruiz (57) ABSTRACT

Various technologies and techniques are disclosed for using transactional memory hardware to accelerate virtualization or emulation. A central processing unit is provided with the transactional memory hardware. Code backpatching can be facilitated by providing transactional memory hardware that supports a facility to maintain private memory state and an atomic commit feature. Changes made to certain code are stored in the private state facility. Backpatching changes are enacted by attempting to commit all the changes to memory at once using the atomic commit feature. An efficient call return stack can be provided by using transactional memory hardware. A call return cache stored in the private state facility captures a host address to return to after execution of a guest function completes. A direct-lookup hardware-based hash table is used for the call return cache.

16 Claims, 10 Drawing Sheets

U.S. PATENT DOCUMENTS

| | | | | |
|---|---|---|---|---|
| 2008/0120590 | A1* | 5/2008 | Wang et al. | 717/100 |
| 2008/0126764 | A1* | 5/2008 | Wu et al. | 712/226 |
| 2009/0006750 | A1 | 1/2009 | Taillefer et al. | |
| 2009/0007107 | A1 | 1/2009 | Taillefer et al. | |

OTHER PUBLICATIONS

Marathe, Virendra J., et al. "Lowering the Overhead of Nonblocking Sortware Transactional Memory." 11 pages. May 17, 2006.

Adl-Tabatabai, Ali-Reza, et al. "Unlocking Concurrency." ACM QUEUE.10 pages. Dec./Jan. 2006-2007.

International Search Report and Written Opinion Received for PCT Application No. PCT/US2008/067147, mailed on Mar. 30, 2009, 11 pages.

McDonald et al., "Architectural Semantics for Practical Transactional Memory" in: Proceedings of the 33rd Annual International Symposium on Computer Architecture, 2006, pp. 53-65, Jun. 2006.

Njoroge et al., "ATLAS: A Chip-Multiprocessor with Transactional Memory Support", in: Proceedings of the Conference and Exhibition on Design, automation and test in Europe, 2007, pp. 3-8, Apr. 2007.

Chung et al., "Tradeoffs in Transactional Memory Virtualization", in: Proceedings of the 2006 ASPLOS Conference Session: Transactional memory, 2006, pp. 371-381, Oct. 2006.

Abramson et al., "Intel Virtualization Technology for Directed I/O", Intel Technology Journal, vol. 10, Issue 03 Aug. 10, 2006, pp. 179-192.

Office Action for U.S. Appl. No. 11/823,212 mailed Apr. 2, 2010 (13 pages).

Final Office Action for U.S. Appl. No. 11/823,212 mailed Oct. 14, 2010 (12 pages).

Office Action for U.S. Appl. No. 11/823,212 mailed Mar. 17, 2011 (14 pages).

Written Opinion of the International Searching Authority and International Search Report for International Application No. PCT/US2008/067144 mailed Dec. 31, 2008 (10 pages).

International Preliminary Report on Patentability for International Application No. PCT/US2008/067144 mailed Jan. 14, 2010 (6 pages).

Supplementary European Search Report for Application No. EP 08 771 212.1 mailed Jun. 8, 2010 (9 pages).

Office Action for U.S. Appl. No. 11/823,224 mailed Jun. 25, 2010 (10 pages).

Written Opinion of the International Searching Authority and International Search Report for International Application No. PCT/US2008/067146 mailed Dec. 15, 2008 (10 pages).

International Preliminary Report on Patentability for International Application No. PCT/US2008/067146 mailed Jan. 14, 2010 (6 pages).

Supplementary European Search Report for Application No. EP 08 771 214.7 mailed Jun. 8, 2010 (10 pages).

Communication for Application No. EP 08 771 214.7 mailed Mar. 4, 2011 (7 pages).

International Preliminary Report on Patentability for International Application No. PCT/US2008/067147 mailed Jan. 14, 2010 (6 pages).

Final Office Action for U.S. Appl. No. 11/823,212 mailed Oct. 24, 2011 (17 pages).

Communication for EP Application No. 08 771 212.1 mailed Oct. 26, 2011 (6 pages).

Restriction Requirement for U.S. Appl. No. 11/823,224 mailed May 11, 2010 (7 pages).

Office Action for U.S. Appl. No. 11/823,224 mailed Apr. 15, 2011 (12 pages).

Office Action for U.S. Appl. No. 11/823,224 mailed Oct. 14, 2011 (8 pages).

Notice of Allowance for U.S. Appl. No. 11/823,224 mailed Feb. 8, 2011 (11 pages).

First Office Action for Chinese Patent Application No. 200880022394.3 dispatched Jul. 22, 2011 (10 pages).

Ananian, et al., "Unbounded Transactional Memory," Proceedings of the 11th Symposium on High-Performance Computer Architecture, pp. 316-327 (Feb. 2005).

* cited by examiner

LEVERAGING TRANSACTIONAL MEMORY HARDWARE TO ACCELERATE VIRTUALIZATION AND EMULATION

BACKGROUND

Emulation is a technique that involves providing the functionality of a central processing unit from software. One advantage to emulation is that you can run software designed for a specific type of processor on any other type of processor. Virtualization is a technique that provides the ability to partition hardware in a way that allows more than one operating system to run simultaneously. With virtualization, a physical central processing unit is partitioned into multiple contexts. Each context then takes turns running directly on the processor. Even though virtualization products are generally faster than emulation products, both types of products today suffer from several complications that limit the speed that can be achieved. As one example, dealing with concurrency during emulation requires additional synchronization which can slow down serial performance. As a second example, tracking self-modifying code under emulation usually incurs a substantial performance burden.

SUMMARY

Various technologies and techniques are disclosed for using transactional memory hardware to accelerate virtualization or emulation. One or more central processing units are provided with transactional memory hardware that is operable to accelerate virtualization. The transactional memory hardware has a facility to maintain private state, a facility to render memory accesses from other central processing units visible to software, and support for atomic commit of the private state.

In one implementation, the transactional memory hardware can be used, for example, to facilitate emulation of precise exception semantics. The private state is operable to enable an emulated state to remain inconsistent with an architectural state and only synchronized on certain boundaries. An optimized sequence of instructions is executed using chunk-accurate simulation to try and achieve a same end effect as a slower instruction-accurate simulation, isolated in private state, which is only committed in case the entire chunk is successfully emulated.

In another implementation, state isolation can be facilitated by providing isolated private state on transactional memory hardware and storing the stack of a host that is performing emulation in the isolated private state.

In yet another implementation, self-modifying code can be detected using the transactional memory hardware. Memory accesses performed by a central processing unit can be monitored by software to detect that a guest being emulated has made a self modification to its own code sequence.

Transactional memory hardware can be used in one implementation to facilitate dispatch table updates in multithreaded environments by taking advantage of the atomic commit feature. An emulator is provided that uses a dispatch table stored in main memory to convert a guest program counter into a host program counter. The dispatch table is accessed to see if the dispatch table contains a particular host program counter for a particular guest program counter. When a host program counter is not found, transactional memory hardware can be used to introduce a new mapping in the table.

In yet another implementation, code backpatching can be facilitated by providing transactional memory hardware that supports a facility to maintain private memory state and an atomic commit feature. Changes made to certain code are stored in the private state facility. Backpatching changes are enacted by attempting to commit all the changes to memory at once using the atomic commit feature.

An efficient call return cache can be provided in one implementation by using transactional memory hardware. A call return cache stored in the private state facility captures a host address to return to after execution of a guest function completes. A direct-lookup hardware-based hash table is used for the call return cache.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a virtualization or emulation system, but the technologies and techniques also serve other purposes in addition to these. In another implementation, the system may include one or more central processors that use transactional memory hardware to accelerate virtualization and/or emulation.

Figure 1:
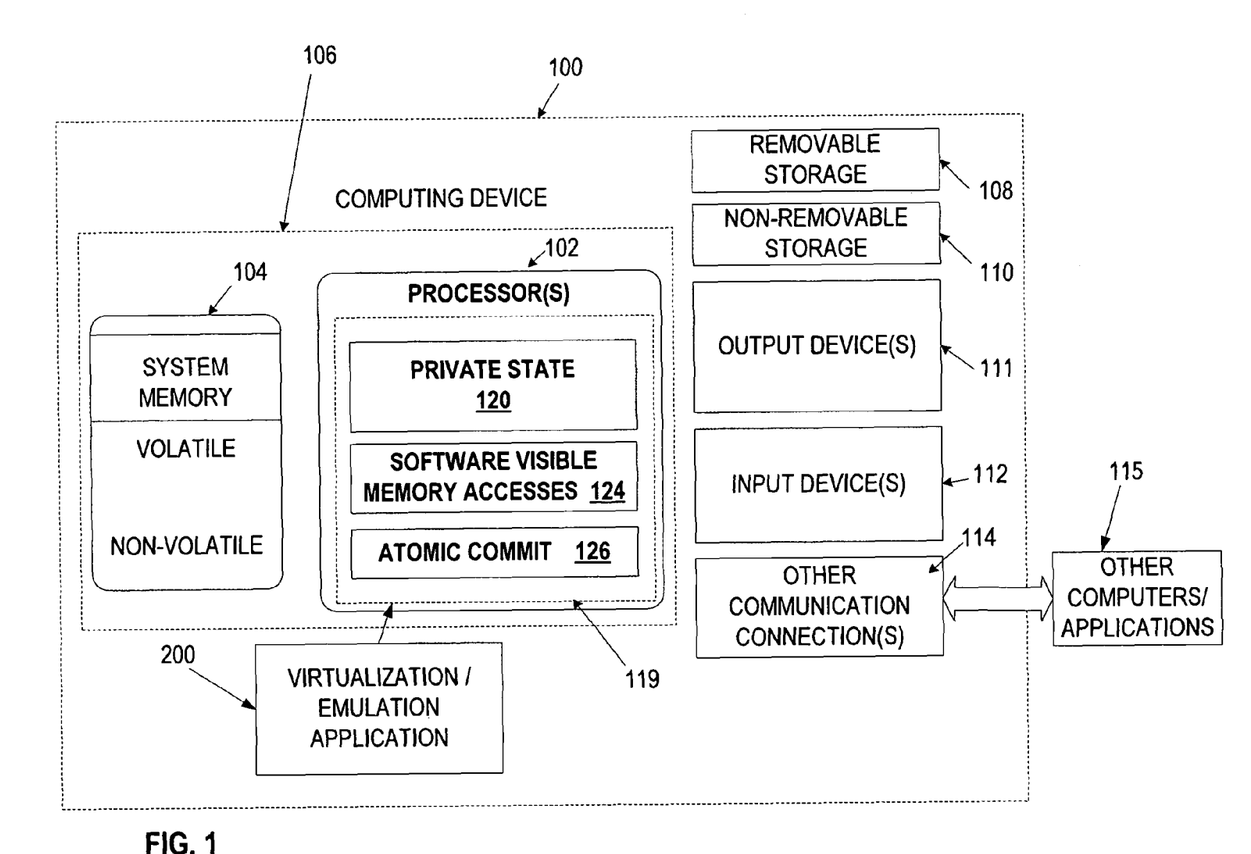
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one central processing unit 102 and memory 104. Central processing unit(s) each have transactional memory hardware 119 that includes a facility to maintain private state 120, a facility to render memory accesses from other central processing units visible to software 124, and support for atomic commit of the private state 126. The private state 120 is invisible to other central processing units until it is explicitly atomically committed by owning processing unit. The private state 120 is also discardable. When the central processing discards the private state, its view of memory is reverted to the current architectural state. The software visible memory accesses 124 allow software running on the central processing unit to detect that another central processing unit is accessing specific memory locations. The atomic commit feature 126 allows the private state of the central processing unit to enter a main memory system atomically as a unit as part of an atomic commit. These transactional memory hardware features are used in various scenarios for enhancing virtualization and/or emulation, as described in further detail herein.

Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes virtualization/emulation application 200. Virtualization/emulation application 200 will be described in further detail in FIG. 2.

Figure 2:
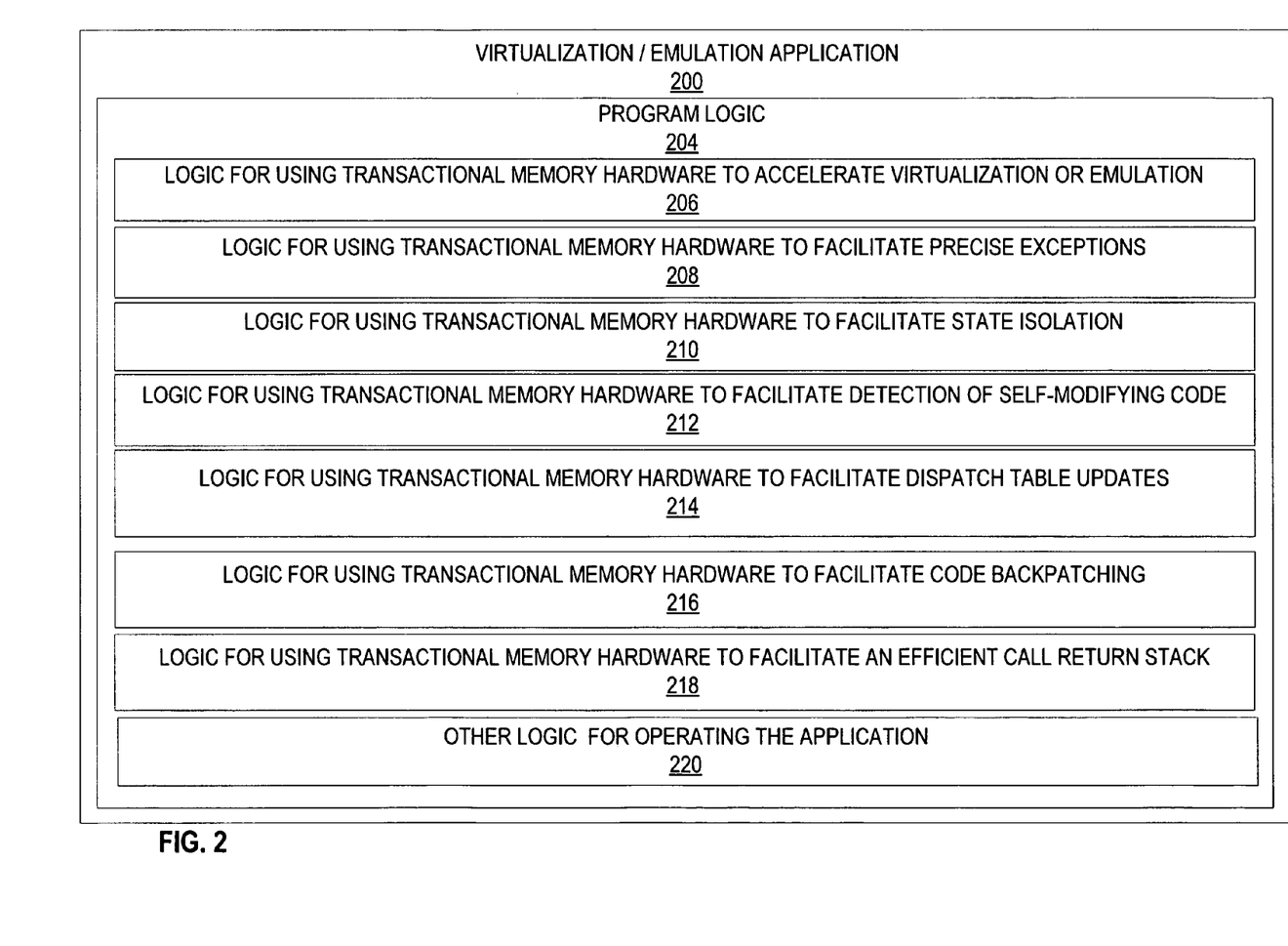
FIG. 2 is a diagrammatic view of a virtualization/emulation application of one implementation operating on the computer system of FIG. 1.

Turning now to FIG. 2 with continued reference to FIG. 1, a virtualization/emulation application 200 operating on computing device 100 is illustrated. Virtualization/emulation application 200 is one of the application programs that reside on computing device 100. However, it will be understood that virtualization/emulation application 200 can alternatively or additionally be embodied as computer-executable instructions on one or more computers and/or in different variations than shown on FIG. 1. Alternatively or additionally, one or more parts of virtualization/emulation application 200 can be part of system memory 104, on other computers and/or applications 115, or other such variations as would occur to one in the computer software art.

Virtualization/emulation application 200 includes program logic 204, which is responsible for carrying out some or all of the techniques described herein. Program logic 204 includes logic for using transactional memory hardware to accelerate virtualization or emulation 206 (as described below with respect to FIG. 3); logic for using transactional memory hardware to facilitate emulation of precise exception semantics 208 (as described below with respect to FIGS. 3-5); logic for using transactional memory hardware to facilitate state isolation 210 (as described below with respect to FIG. 6); logic for using transactional memory hardware to facilitate detection of self-modifying code 212 (as described below with respect to FIG. 7); logic for using transactional memory hardware to facilitate dispatch table updates 214 (as described below with respect to FIG. 8); logic for using transactional memory hardware to facilitate code backpatching 216 (as described below with respect to FIG. 9); logic for using transactional memory hardware to facilitate an efficient call return cache 218 (as described below with respect to FIG. 10); and other logic for operating the application 220. In one implementation, program logic 204 is operable to be called programmatically from another program, such as using a single call to a procedure in program logic 204.

Figure 3:
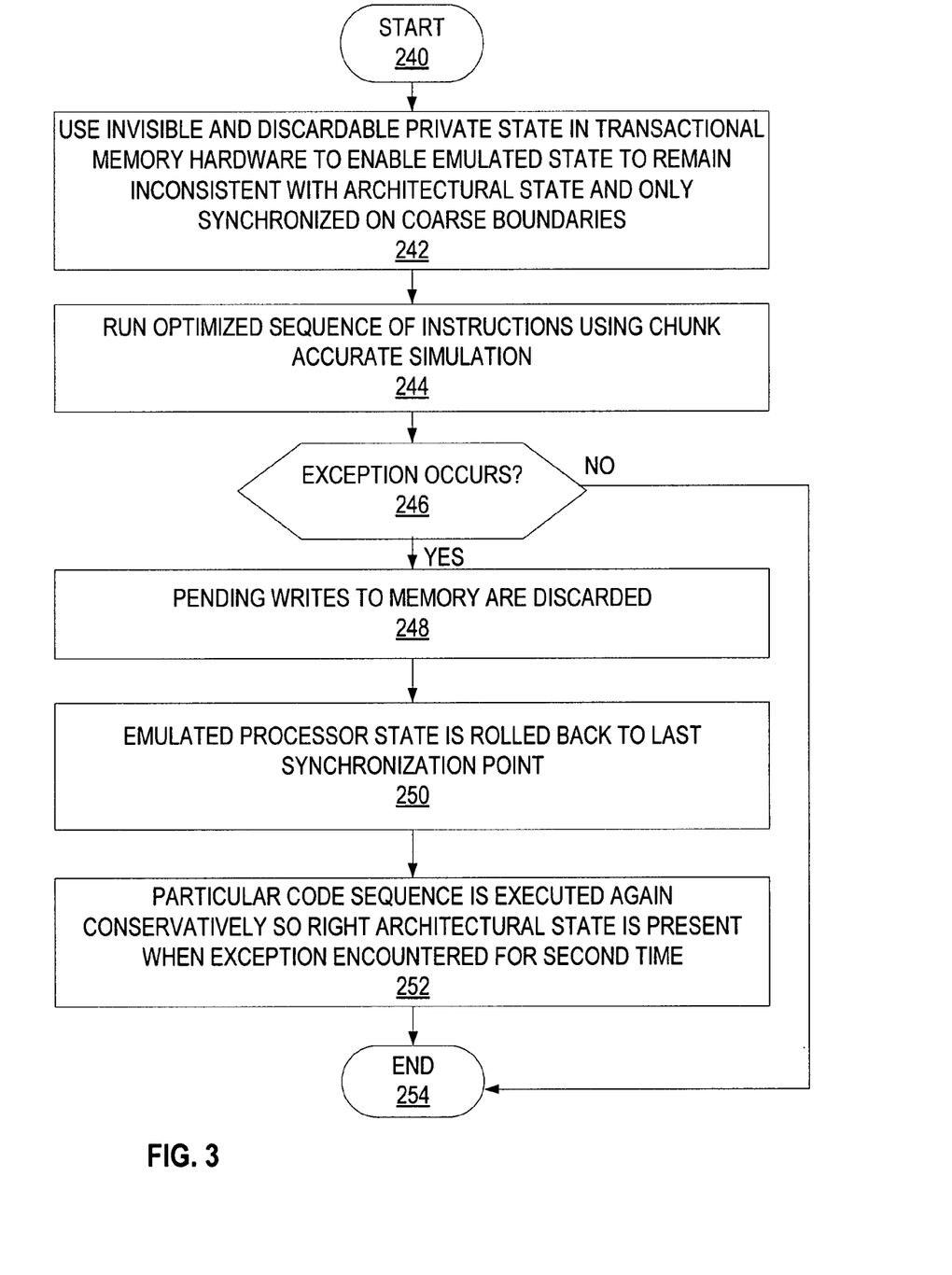
FIG. 3 is a process flow diagram for one implementation of the system of FIG. 1 illustrating the stages involved in using transactional memory hardware to facilitate emulation of precise exception semantics.

Turning now to FIGS. 3-10 with continued reference to FIGS. 1-2, the stages for implementing one or more implementations of virtualization/emulation application 200 are described in further detail. In some implementations, the processes of FIGS. 3-10 are at least partially implemented in the operating logic of computing device 100. FIG. 3 illustrates one implementation of the stages involved in using transactional memory hardware to facilitate emulation of precise exception semantics. The process begins at start point 240 with using invisible and discardable private state in the transactional memory hardware to enable the emulated state to remain inconsistent with architectural state and only synchronized on coarse boundaries (stage 242). The system runs the optimized sequence of instructions using a chunk-accurate simulation (stage 244). If no exception occurs (decision point 246), then the system is able to complete the simulation with generally better performance than would be possible using fully instruction-accurate simulation. However, if an exception occurs (decision point 246), then the pending writes to memory are discarded (stage 248). The emulated processor state is rolled back to the last synchronization point (stage 250). The particular code sequence is executed again conservatively using instruction-accurate simulation so that the right architectural state is present when the exception is encountered for the second time (stage 252). In one implementation, that architectural state is precisely the same as the real, non-virtual system being emulated would be in, which is important for correct system-level emulation. This process is illustrated in further detail in the diagrams of FIGS. 4 and 5. The process ends at end point 254.

Figure 4:
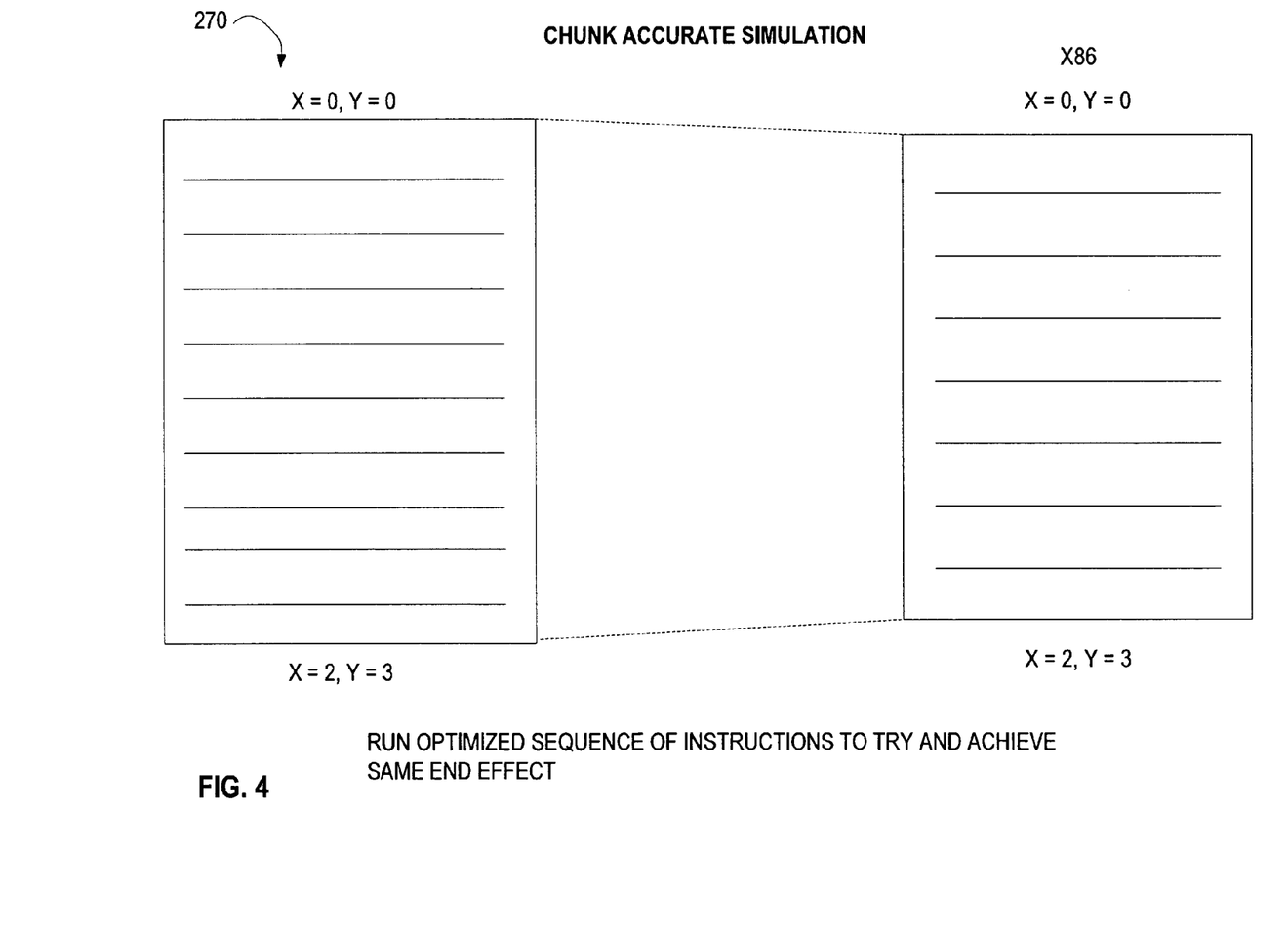
FIG. 4 is a diagram for one implementation of the system of FIG. 1 that illustrates running a chunk-accurate simulation.
Figure 5:
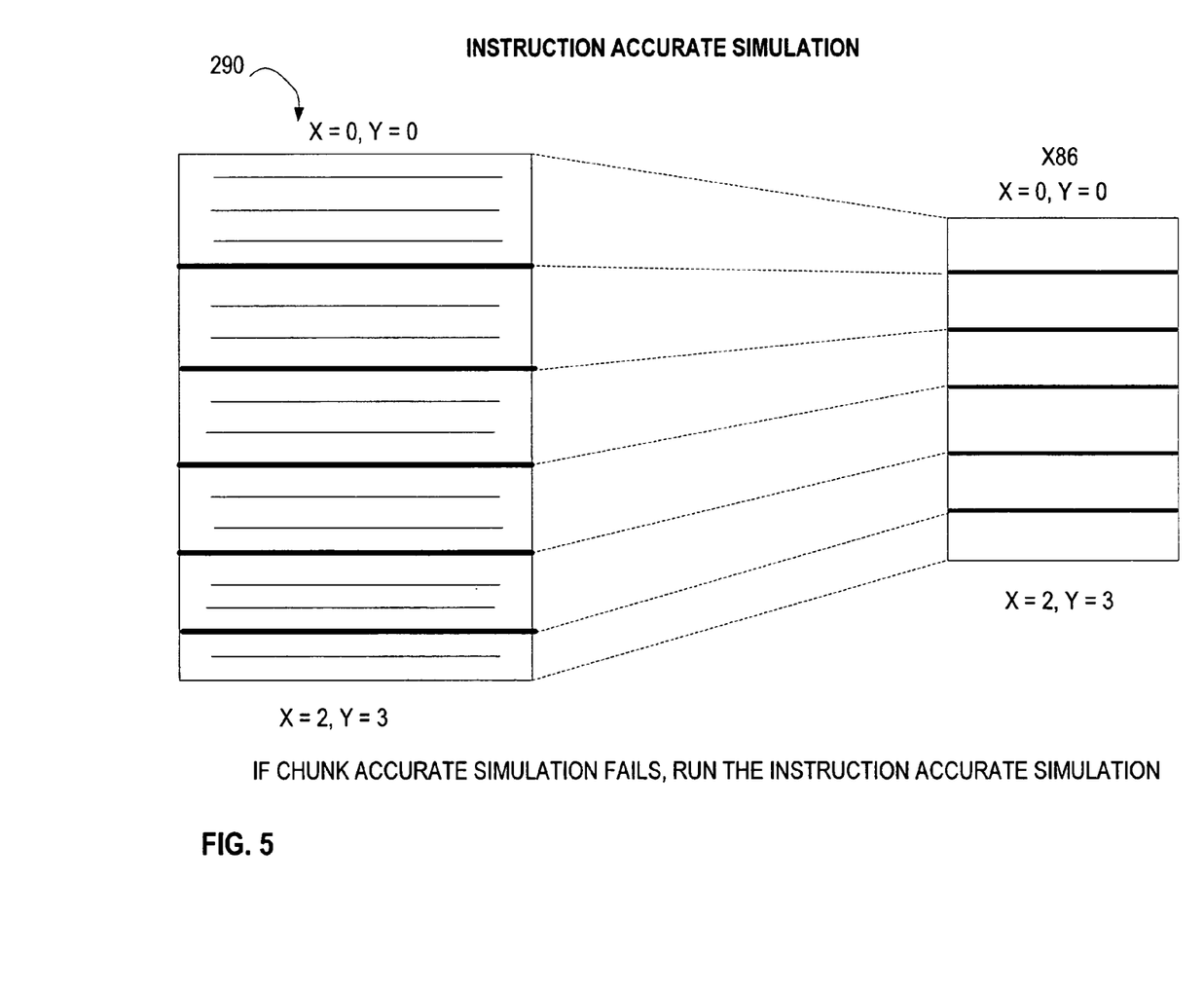
FIG. 5 is a diagram for one implementation of the system of FIG. 1 that illustrates running an instruction-accurate simulation after a chunk-accurate simulation has raised an exception.

Turning now to FIGS. 4 and 5, the use of transactional memory hardware to facilitate emulation of precise exceptions semantics in emulated environments is illustrated in further detail. FIG. 4 is a diagram 270 for one implementation that illustrates running a chunk-accurate simulation. The chunk-accurate simulation runs an optimized sequence of instructions to try and achieve the same end effect as the original sequence of guest instructions, but in a more optimized way than is possible using an instruction-accurate simulation. The chunk-accurate simulation allows the emulated state to remain inconsistent with architectural state and only be synchronized on coarse boundaries, which is basically the starting point and the ending point of the simulation. If an exception is encountered at any point during the chunk-accurate simulation, then the instruction-accurate simulation illustrated on the diagram 290 of FIG. 5 is executed. The instruction-accurate simulation runs the code sequence conservatively to ensure that the right architectural state is present when the exception is encountered for the second time.

Figure 6:
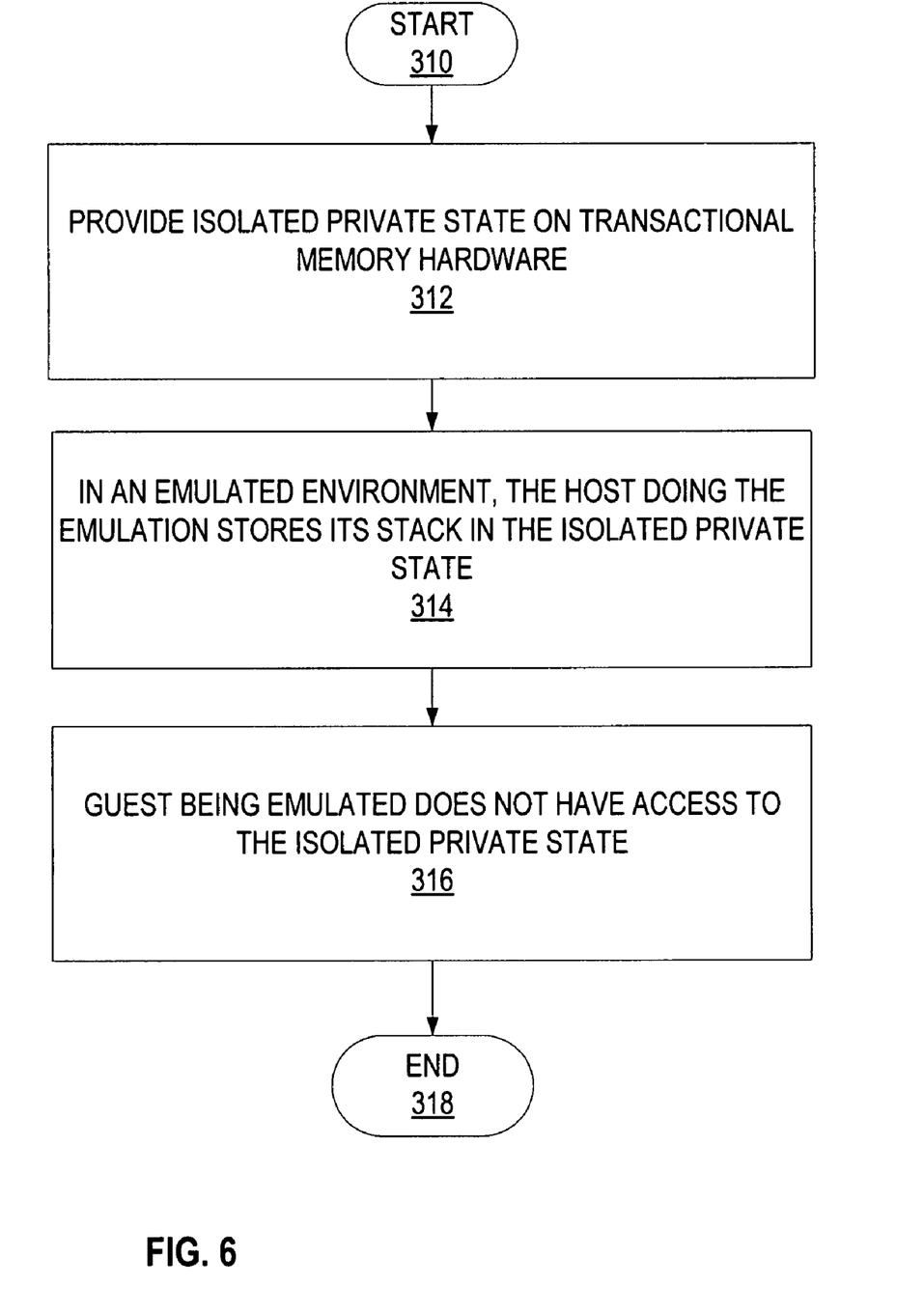
FIG. 6 is a process flow diagram for one implementation of the system of FIG. 1 illustrating the stages involved in using transactional memory hardware to facilitate state isolation.

FIG. 6 illustrates one implementation of the stages involved in using transactional memory hardware to facilitate state isolation. The process begins at start point 310 with providing isolated private state on transactional memory hardware (stage 312). In an emulated environment, the host doing the emulation stores its stack in the isolated private state (stage 314). The isolated private state enables the host to keep the stack in a buffered mode, which allows the host to avoid expensive runtime checks. The isolated private state is discardable. This means that when the central processing unit discards the private state, its view of memory is reverted to the current architectural state. The guest being emulated does not have access to the isolated private state (stage 316). The process ends at end point 318.

Figure 7:
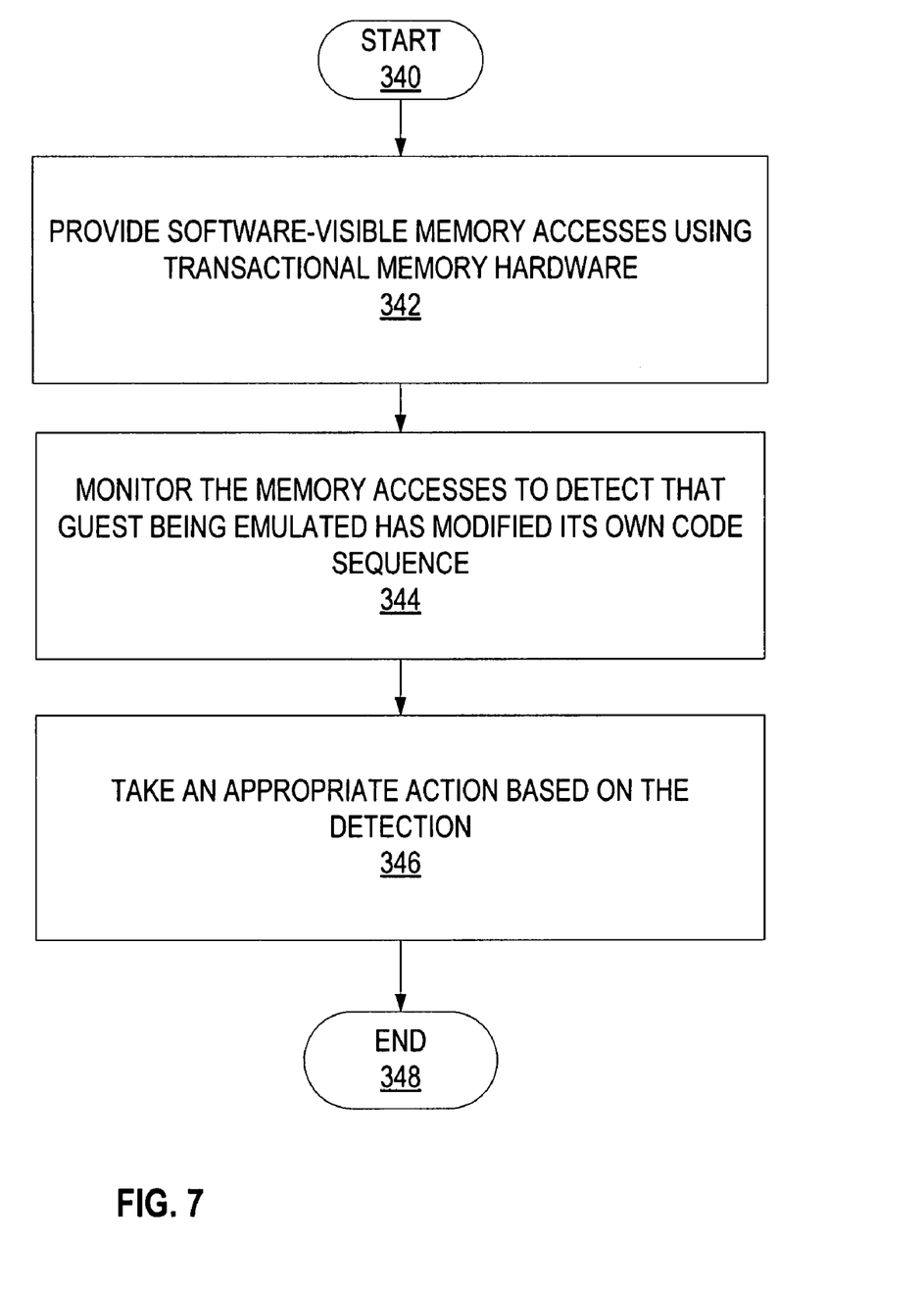
FIG. 7 is a process flow diagram for one implementation of the system of FIG. 1 that illustrates the stages involved in using transactional memory hardware to facilitate detection of self-modifying code under emulation.

FIG. 7 illustrates one implementation of the stages involved in using transactional memory hardware to facilitate detection of self-modifying code. The process begins at start point 340 providing software-visible memory accesses using transactional memory hardware (stage 342). The system monitors the memory accesses performed by a central processing unit to detect that the guest being emulated has modified its own code sequence (stage 344). Even memory accesses from a separate central processing unit can be detected. The system then takes an appropriate action based on the detection (stage 346). A few non-limiting examples of such appropriate actions can include recompiling the code sequence to incorporate the self modification made by the guest, raising an exception, and/or stopping execution. Another non-limiting example of an appropriate action can include switching to an interpretation of machine instructions (as opposed to compilation) for just the part of the code that is self-modifying. In one implementation, this approach would be slower than compilation, but very accurate and would work exactly as the self-modifying code was intended to. Other appropriate actions are also possible. The process ends at end point 348.

Figure 8:
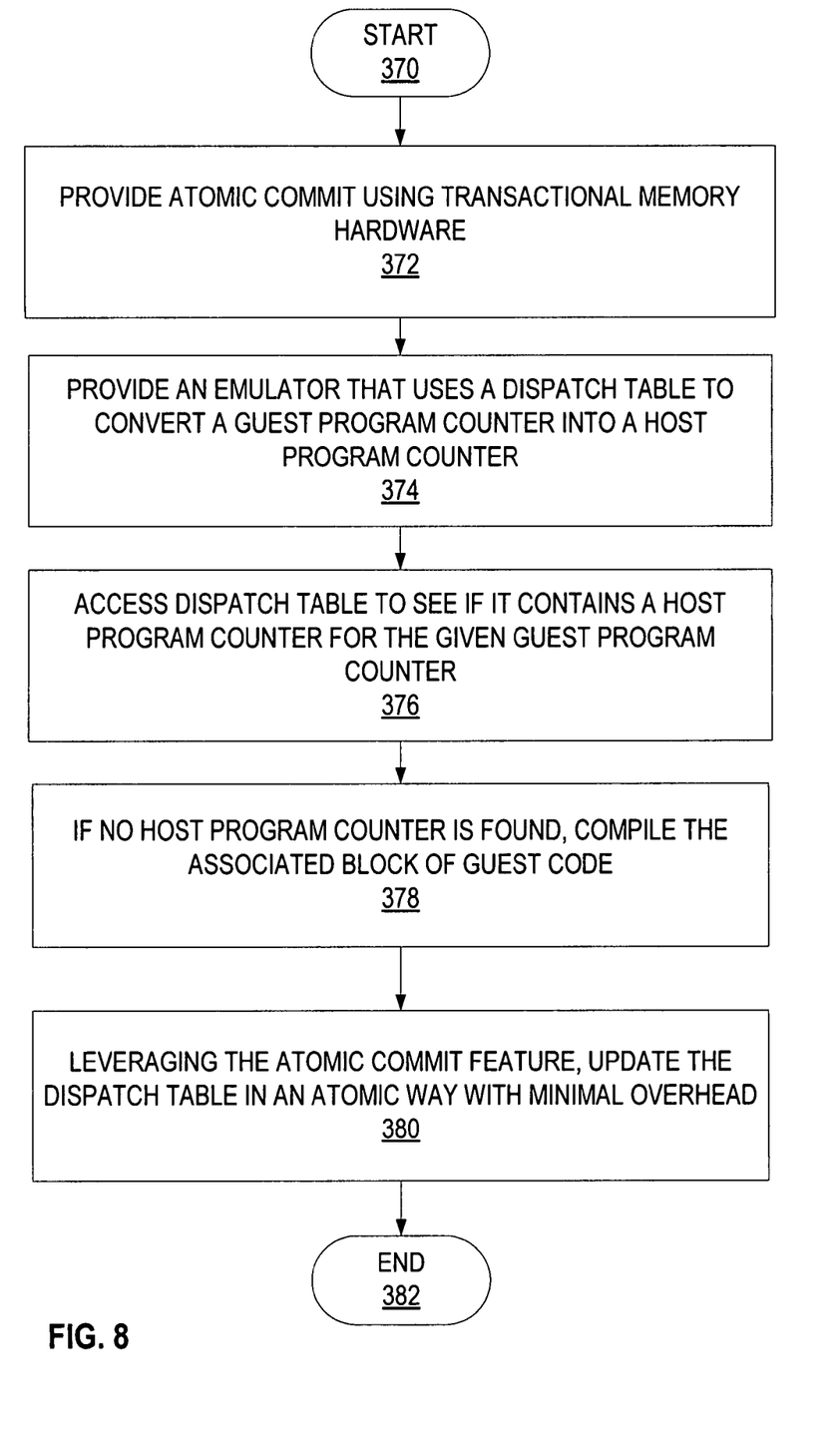
FIG. 8 is a process flow diagram for one implementation of the system of FIG. 1 that illustrates the stages involved in using transactional memory hardware to facilitate dispatch table updates in multithreaded environments.

FIG. 8 illustrates one implementation of the stages involved in using transactional memory hardware to facilitate dispatch table updates in multithreaded environments. The process begins at start point 370 with providing an atomic commit feature using transactional memory hardware (stage 372). The system provides an emulator that uses a dispatch table stored in main memory to convert a guest program counter into a host program counter (stage 374). The system accesses the dispatch table to see if it contains a host program counter for the given guest program counter (stage 376). If no host program counter is found, the system compiles the associated block of guest code (stage 378). The update to the dispatch table is performed in private memory, and when the update is fully performed, it is atomically committed to main memory. Leveraging the atomic commit feature, the system updates the dispatch table in an atomic way with minimal overhead (stage 380). The process ends at end point 382.

Figure 9:
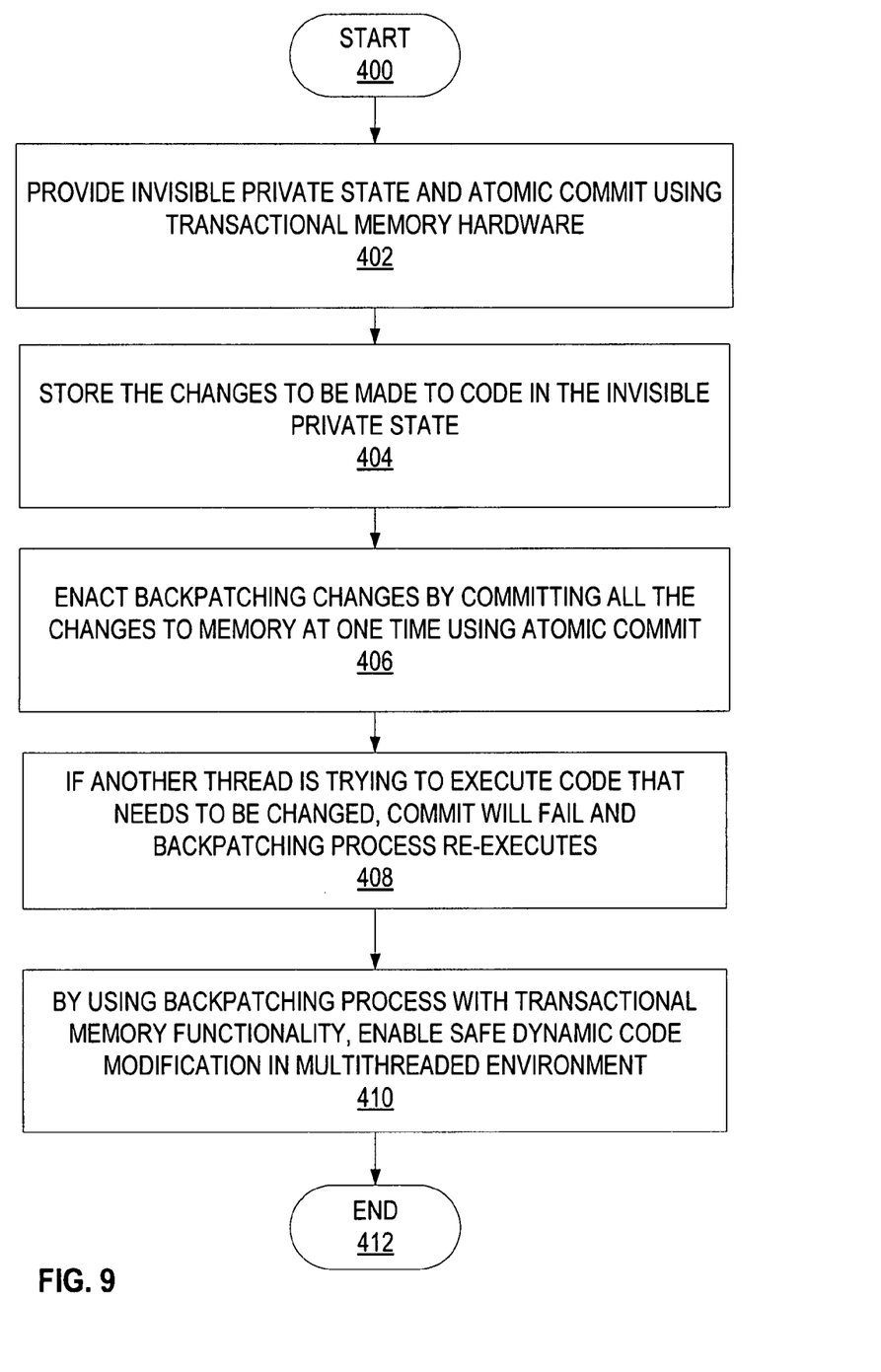
FIG. 9 is a process flow diagram for one implementation of the system of FIG. 1 that illustrates the stages involved in using transactional memory hardware to facilitate code backpatching in multithreaded environments.

FIG. 9 illustrates one implementation of the stages involved in using transactional memory hardware to facilitate code backpatching in multithreaded environments. The process begins at start point 400 with providing invisible private state and atomic commit facilities using transactional memory hardware (stage 402). The system stores the changes to be made to code in the invisible private state (stage 404). The changes to be made to the code can be received from one or more threads. The backpatching changes are enacted by attempting to commit all the changes to memory at one time using atomic commit (stage 406). If another thread is trying to execute code that needs to be changed, commit will fail and the backpatching process re-executes by attempting to commit all the changes to memory atomically again (stage 408). By using such backpatching process with transactional memory functionality, safe dynamic code modification is enabled in a multithreaded environment (stage 410). The process ends at end point 412.

Figure 10:
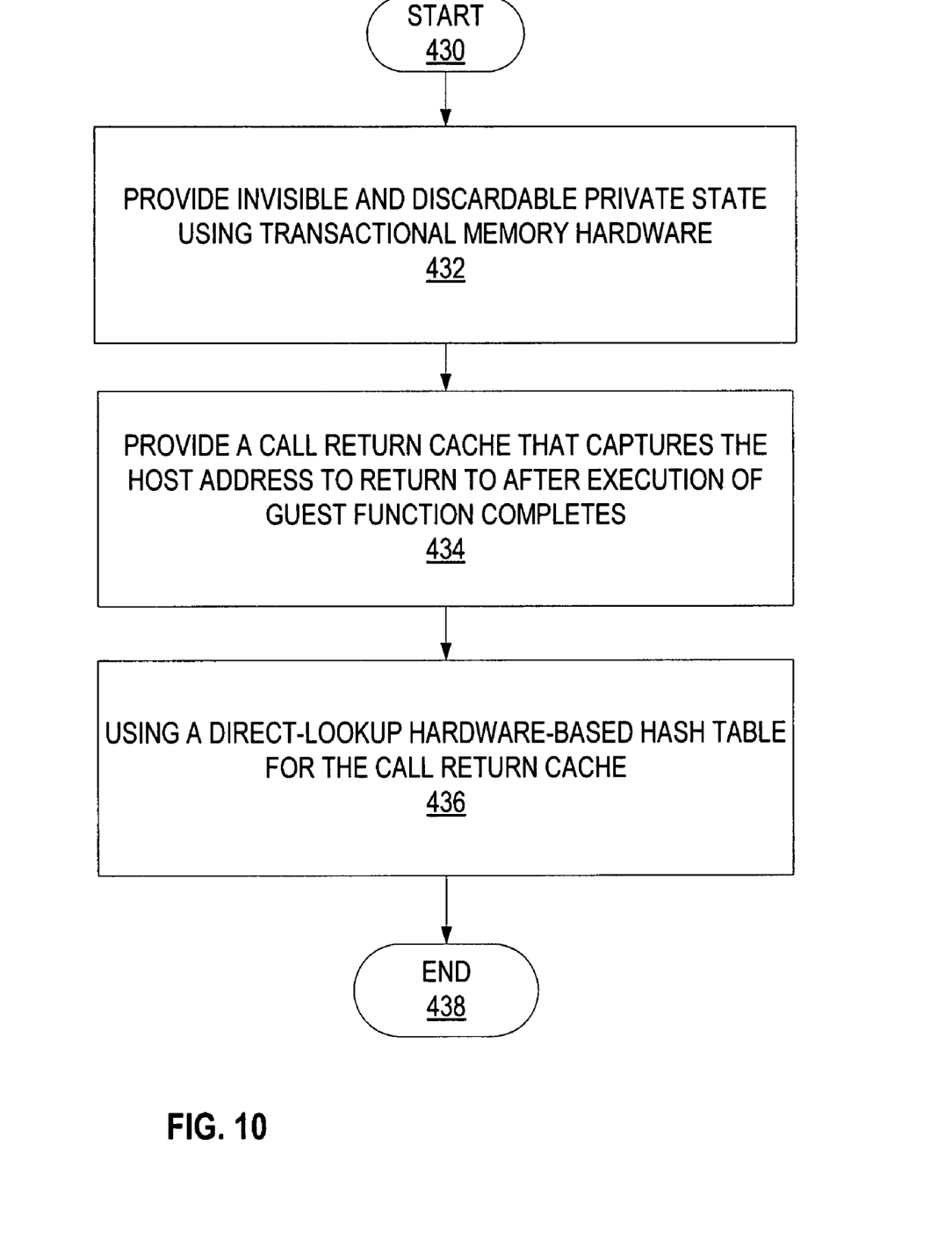
FIG. 10 is a process flow diagram for one implementation of the system of FIG. 1 that illustrates the stages involved in using transactional memory hardware to facilitate an efficient call return cache.

FIG. 10 illustrates one implementation of the stages involved in using transactional memory hardware to facilitate an efficient call return cache. The process begins at start point 430 with providing invisible and discardable private state using transactional memory hardware (stage 432). The system provides a call return cache stored in the private state facility that captures the host address to return to after execution of the guest function completes (stage 434). A direct-lookup hardware-based hash table is used for the call return cache (stage 436). In one implementation, the call return cache supports more efficient lookups than normal lookups in a dispatch table. The process ends at end point 438.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for using transactional memory hardware to facilitate code backpatching comprising:
   receiving changes to be made to certain code from at least two threads;
   storing the changes to be made to the certain code in a private state facility of transactional memory hardware on a central processing unit;
   enacting backpatching changes by attempting to commit all the changes to memory at once using an atomic commit feature of the transactional memory hardware;
   if another thread is trying to execute the certain code to be changed, causing the attempting to commit all the changes to memory to fail and re-enacting backpatching changes by attempting to commit all the changes to memory at once using the atomic commit feature of the transactional memory hardware.

2. The method of claim 1, wherein by using the atomic commit feature to enact backpatching changes, dynamic code modification is enabled in a multithreaded environment.

3. The method of claim 2, wherein the dynamic code modification is performed safely.

4. A system comprising:
   a central processing unit, the central processing unit comprising transactional memory hardware with a facility to maintain private state for accelerating emulation;

a call return cache stored in the private state facility that is operable to capture a host address to return to after execution of a guest function completes; and a direct-lookup hardware-based hash table that is operable to be used for the call return cache.

5. The system of claim 4, wherein the private state is invisible to other central processing units.

6. The system of claim 4, wherein the private state is discardable.

7. A method for accelerating emulation using transactional memory hardware comprising the steps of accessing a central processing unit with transactional memory hardware that is operable to accelerate emulation;

using the transactional memory hardware to accelerate emulation of precise exception semantics for emulated programs; and using the transactional memory hardware to accelerate state isolation for emulated programs.

8. The method of claim 7, further comprising:

using the transactional memory hardware to facilitate detection of self-modifying code for emulated programs.

9. The method of claim 7, further comprising:

using the transactional memory hardware to facilitate dispatch table updates for emulated programs.

10. The method of claim 7, further comprising:

using the transactional memory hardware to facilitate code backpatching for emulated programs.

11. The method of claim 7, further comprising:

using the transactional memory hardware to facilitate a call return cache used by emulated programs.

12. The method of claim 7, wherein the transactional memory hardware supports a facility to maintain private state.

13. The method of claim 11, wherein the private state is invisible to other central processing units.

14. The method of claim 11, wherein the private state is discardable.

15. The method of claim 7, wherein the transactional memory hardware enables software to monitor memory accesses performed by other central processing units.

16. The method of claim 7, wherein the transactional memory hardware supports an atomic commit feature.

* * * * *